(12) United States Patent
Serizawa et al.

(10) Patent No.: US 7,545,599 B2
(45) Date of Patent: Jun. 9, 2009

(54) DISK DRIVE WITH VIBRATION SUPPRESSION MEMBER DISPOSED NEAR HEAD ASSEMBLY

(75) Inventors: Kohji Serizawa, Kanagawa (JP);
Hitoshi Tsujino, Kanagawa (JP);
Hirokazu Tanizawa, Kanagawa (JP);
Takeji Sumiya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 408 days.

(21) Appl. No.: 11/318,261

(22) Filed: Dec. 22, 2005

(65) Prior Publication Data

US 2006/0164751 A1 Jul. 27, 2006

(30) Foreign Application Priority Data

Dec. 27, 2004 (JP) ............................. 2004-378114

(51) Int. Cl.
*G11B 33/08* (2006.01)
(52) U.S. Cl. .................................................. 360/97.02
(58) Field of Classification Search .............. 360/97.01, 360/97.02, 97.03, 97.04, 98.01
See application file for complete search history.

(56) References Cited

U.S. PATENT DOCUMENTS 5,029,027 A * 7/1991 Sleger ...................... 360/97.03

| 5,587,855 | A | * | 12/1996 | Kim | 360/97.02 |
| 5,590,002 | A | * | 12/1996 | Bracken et al. | 360/97.02 |
| 5,914,836 | A | * | 6/1999 | Pottebaum | 360/264.8 |
| 6,417,986 | B1 | * | 7/2002 | Tran et al. | 360/97.02 |
| 6,912,105 | B1 | * | 6/2005 | Morita et al. | 360/97.01 |
| 7,130,150 | B2 | * | 10/2006 | Ng et al. | 360/97.02 |
| 2002/0044375 | A1 | * | 4/2002 | Hirasaka et al. | 360/97.01 |

FOREIGN PATENT DOCUMENTS

JP 09-180426 7/1997

* cited by examiner

*Primary Examiner*—Jefferson Evans
(74) *Attorney, Agent, or Firm*—Townsend and Townsend and Crew LLP; John Henkhaus (57) ABSTRACT

Embodiments of the invention provide a disk drive suppressing a surface deformation of a top cover. In one embodiment, the disk drive includes a base and a top cover. The base accommodates a head assembly, a circuit unit, and a recording medium. The top cover is supported by the base at a plurality of inner points of support and peripheral edge points of support on a peripheral edge portion near a portion accommodating the head assembly and the circuit unit. The top cover covers the accommodating portion of the base. A vibration suppression member for suppressing vibration of the top cover is disposed in a polygon. The polygon has, as vertices, a plurality of inner points of support and, among the peripheral edge points of support, the peripheral edge points of support near the portion accommodating the head assembly and the circuit unit. The vibration suppression member is disposed at a position in the polygonal portion corresponding to an area near a loop of vibration in a surface of the top cover.

16 Claims, 7 Drawing Sheets

DISK DRIVE WITH VIBRATION SUPPRESSION MEMBER DISPOSED NEAR HEAD ASSEMBLY

CROSS-REFERENCES TO RELATED APPLICATIONS

This application claims priority from Japanese Patent Application No. JP2004-378114, filed Dec. 27, 2004, the entire disclosure of which is incorporated herein by reference.

BACKGROUND OF THE INVENTION

The present invention relates to a disk drive such as a hard disk drive.

Typically, a disk drive, such as a hard disk drive, includes a recording medium, a head assembly for reading and writing data from and to the recording medium, and a circuit unit for performing input and output of data to and from an external device. The head assembly is rotatably supported such that a head portion thereof can radially move over the recording medium. Each of these components is accommodated in a base serving as a container. The portion of the base accommodating these components is covered with a top cover.

The top cover is secured to the base on a peripheral edge thereof. The top cover is also secured to a rotational axis of the head assembly using, for example, a screw. An air filter for adjusting an air pressure inside and outside of a housing may be provided in an area near the circuit unit. In this case, the top cover is also supported by the air filter portion.

An example of providing a supporting column in an area near an extension line in the moving direction of the head portion is disclosed in Patent Document 1 (Japanese Patent Laid-open No. Hei 9-180426). This is done to prevent the top cover of the hard disk drive from being deformed.

BRIEF SUMMARY OF THE INVENTION

In recent years, on the other hand, reduction in size of the disk drive, such as the hard disk drive, has been promoted. Further reduction in size is being pursued for the head. As a result, a load balance suppressing flying of the head from the recording medium has been made small and there is a phenomenon, in which a flying height varies widely among different parts.

Under these circumstances, a problem as described in the following arises at sites where computer apparatus and the like mounted with disk drives are implemented. Specifically, assuming a case, in which the computer apparatus receives a drop impact, the components of the computer apparatus press the top cover of the disk drive, thus deforming the top cover surface. The impact can also cause a central axis of the head assembly secured to the top cover to deviate. Consequently, there arise greater part-to-part variations in the head flying height, affecting accuracy in read/write operations.

The deformation in the top cover involved herein is a surface deformation of the following type. Specifically, the amount of deformation is the greatest at the center of vibration (a loop of vibration) when a region on the surface of the top cover enclosed by a polygon is vibrated. This particular polygon has the point of fixation or support of the top cover as a vertex and includes the central axis of the head assembly as one of vertices thereof. It is preferable that a technique for suppressing the deformation be implemented separately from the technique disclosed in Patent Document 1.

It is therefore a feature of the present invention to provide a disk drive suppressing surface deformation of the top cover.

In accordance with an aspect of the present invention, a disk drive includes a base and a top cover portion. The base accommodates a head assembly, a circuit unit, and a recording medium. The top cover portion is supported by the base at a plurality of inner points of support and peripheral edge points of support on a peripheral edge portion near a portion accommodating the head assembly and the circuit unit. The top cover portion covers the accommodating portion of the base. The head assembly is rotatably supported within the base and a rotational axis of the head assembly is secured to the top cover. Further, a vibration suppression member is disposed in a polygon. This polygon has, as vertices, a plurality of inner points of support, and of the peripheral edge points of support, the peripheral edge points of support near the portion accommodating the head assembly and the circuit unit, at a corresponding position in the polygonal portion corresponding to an area near a loop of vibration in a surface of the top cover. The vibration suppression member functions to suppress the vibration of the top cover portion.

It is appropriate herein that the vibration suppression member be a supporting body for supporting the top cover portion at the corresponding position. It is also appropriate that the supporting body be disposed at a part of a structure of the circuit unit and be abutted against the top cover portion at the corresponding position. It is further appropriate that the circuit unit include a flexible circuit board and a circuit base securing the flexible circuit board, and that the supporting body be disposed on an outer peripheral portion of the circuit base.

DETAILED DESCRIPTION OF THE INVENTION

Figure 1:
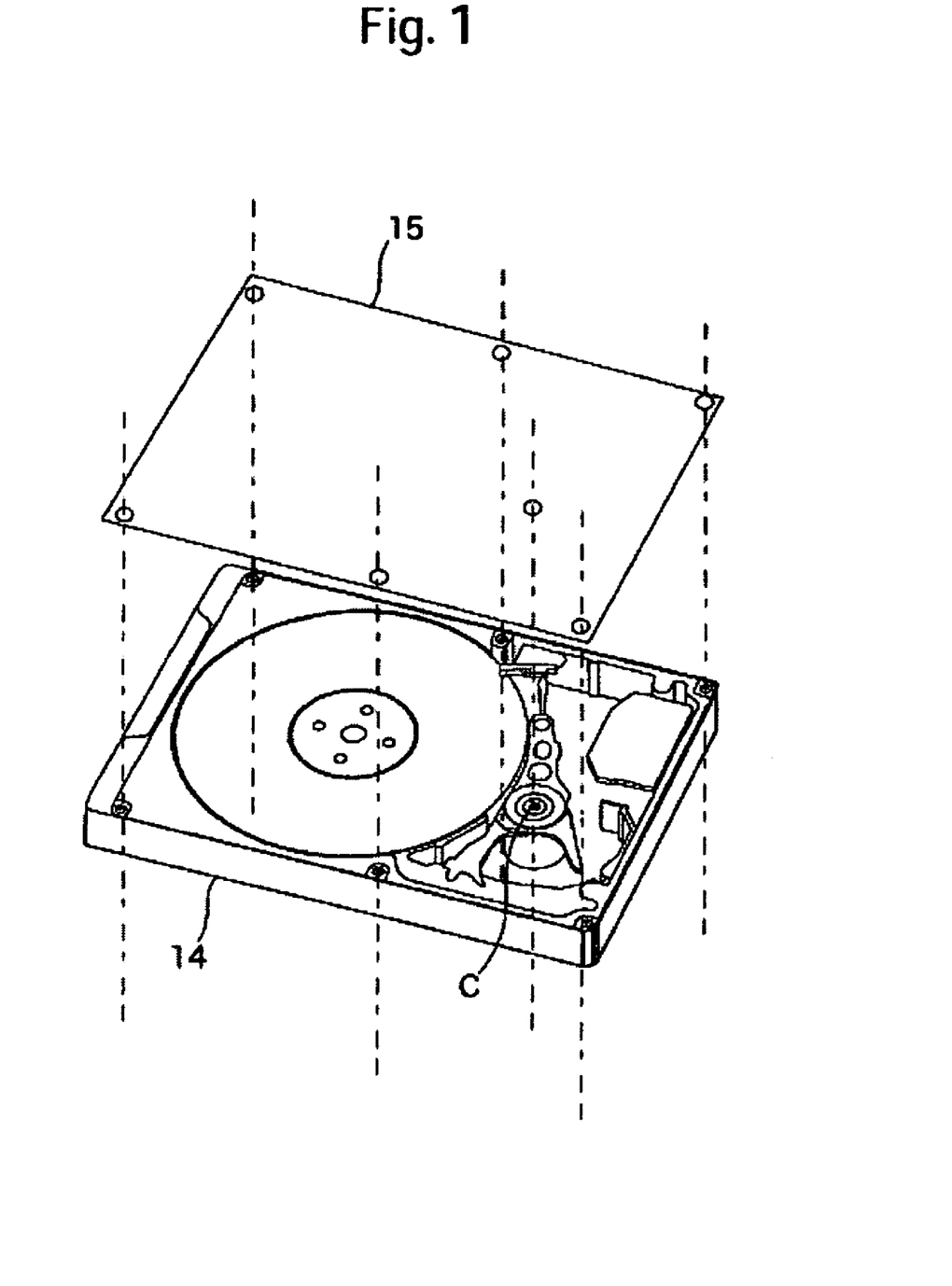
FIG. 1 is a perspective view showing a disk drive according to an exemplary embodiment of the present invention in a condition before a vibration suppression member is mounted.
Figure 2:
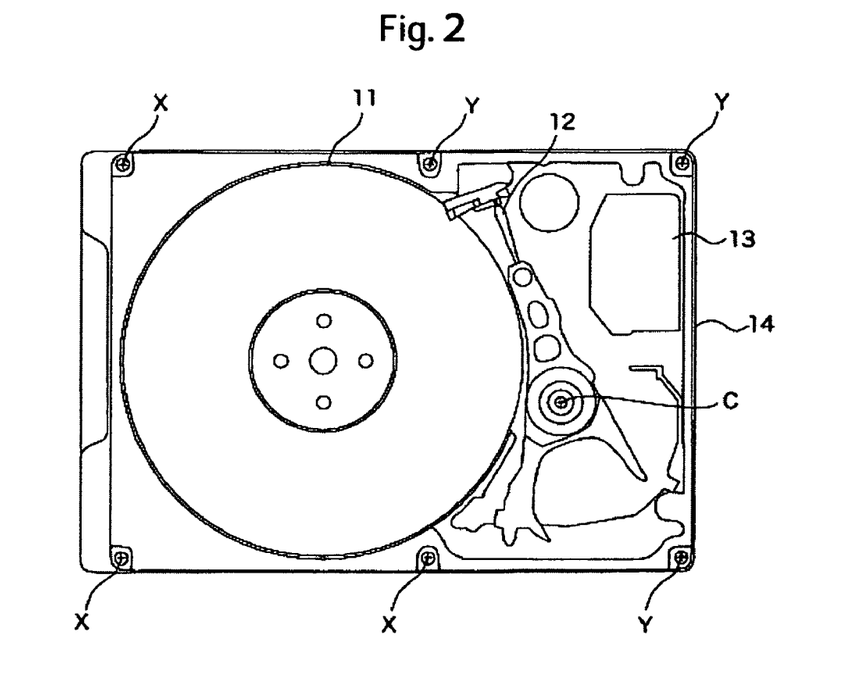
FIG. 2 is a plan view showing the disk drive according to the exemplary embodiment of the present invention in a condition before the vibration suppression member is mounted.

A specific embodiment of the present invention will be described with reference to the accompanying drawings. A disk drive according to the embodiment of the present invention includes a base 14 serving as a container and a top cover 15 as shown in FIG. 1. The base 14 basically accommodates a recording medium 11, a head assembly 12, and a circuit unit 13, as shown in FIG. 2. The head assembly 12 reads and writes data from and to the recording medium 11. The circuit unit 13 performs input and output of data to and from an external device. For the sake of explanation, FIGS. 1 and 2 show a condition, in which a vibration suppression member 16 to be described later is yet to be mounted.

The head assembly 12 is rotatably supported on a rotational axis C so as to allow a head portion to move radially over the recording medium 11. The top cover 15 covers the aforementioned portion of the base 14, in which the recording medium 11, the head assembly 12, and the circuit unit 13 are accommodated (hereinafter referred to as the accommodating portion).

The top cover 15 is secured to a peripheral edge portion of the accommodating portion of the base 14 using screws or the like. The top cover 15 is also secured to the rotational axis C of the head assembly 12 using a screw or the like. That is, the top cover 15 is secured through a plurality of points X, Y on the peripheral edge portion and the rotational axis C of the head assembly 12. The point of fixation on the peripheral edge portion of the accommodating portion will hereinafter be referred to as a peripheral edge point of support. Any other point of fixation will be referred to as an inner point of support. In the example given herein, the inner point of support is the position of the rotational axis C of the head assembly 12.

Figure 3:
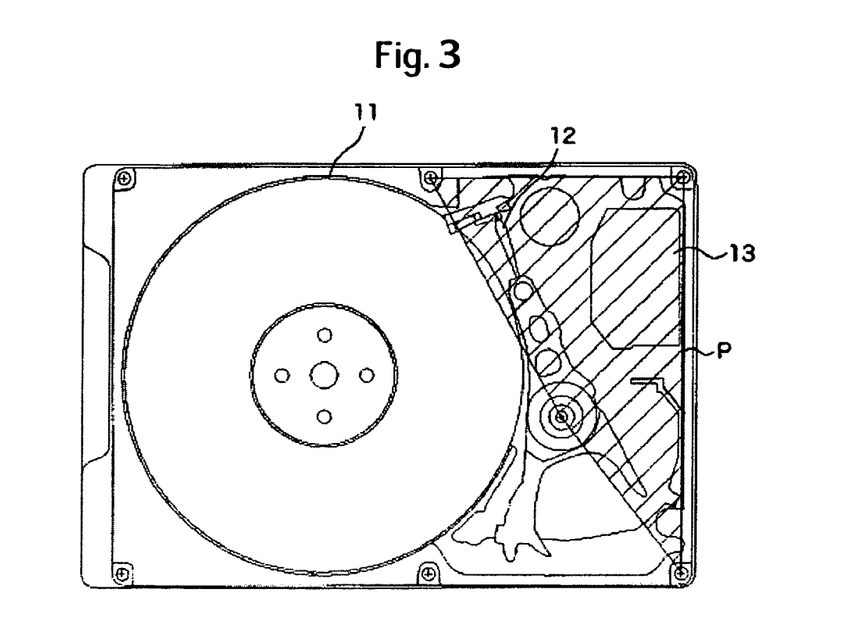
FIG. 3 is an explanatory view showing a range over which the vibration suppression member for the disk drive according to the exemplary embodiment of the present invention is mounted.

Further, of the peripheral edge points of support, those in an area near a portion accommodating the head assembly 12 and the circuit unit 13 will be referred to as attentive points of support (Y). In the embodiment of the present invention, a vibration suppression member 16 for suppressing vibration of the top cover 15 is disposed in a polygon (a shaded portion P of FIG. 3) having the attentive points of support (Y) and the inner point of support C as vertices. The vibration suppression member 16 is disposed at a position in the polygonal portion corresponding to an area near a loop of vibration in a surface of the top cover 15.

Figure 4:
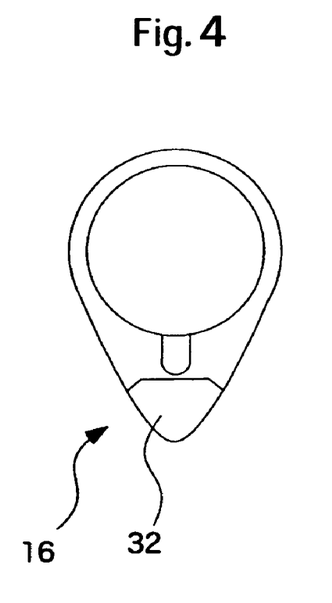
FIG. 4 is a plan view showing an example of the vibration suppression member to be mounted on a filter.
Figure 5:
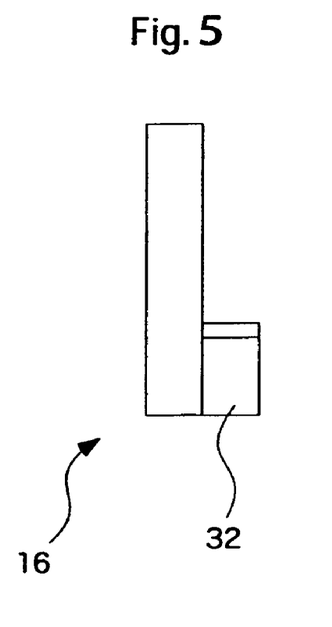
FIG. 5 is a side elevational view showing an example of the vibration suppression member to be mounted on a filter.
Figure 6:
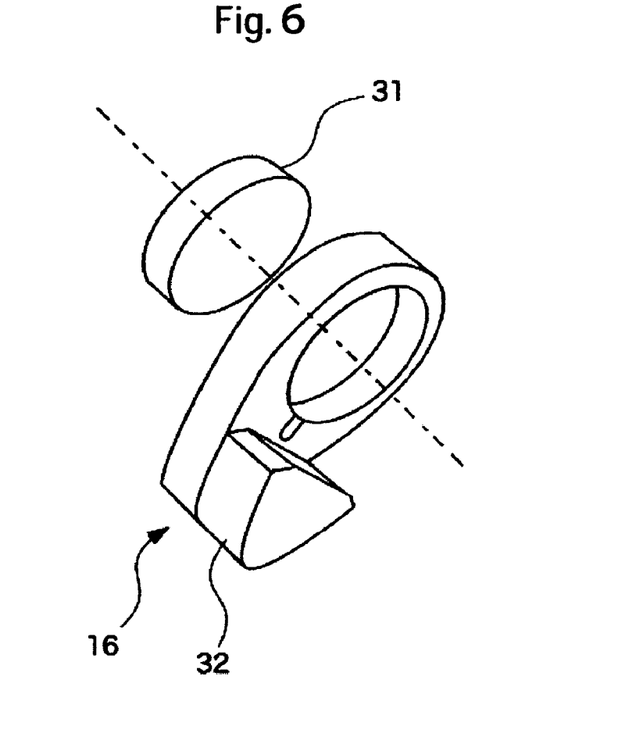
FIG. 6 is a perspective view showing an example of the vibration suppression member to be mounted on a filter.

A specific example of the vibration suppression member 16 will be described. Typically, a filter is disposed in the polygonal portion, in addition to the circuit unit 13 housed therein. Accordingly, the vibration suppression member 16 may, for example, be mounted on the filter. FIG. 4 is a plan view showing an example of the vibration suppression member 16 to be mounted on the filter. FIG. 5 is a side elevational view of the typical vibration suppression member 16. FIG. 6 is a perspective view showing the vibration suppression member 16 to be mounted on the filter. As shown in FIG. 6, the vibration suppression member 16 includes an opening corresponding to the diameter of a filter 31 of a circular cylindrical shape. The vibration suppression member 16 is mounted to the filter 31 by fitting the opening over the filter 31. The filter 31 is mounted on the side of the top cover 15. In addition, a supporting column portion 32 is formed on the vibration suppression member 16. When the top cover 15 is attached to the base 14, a surface of the supporting column portion 32 is in contact with a bottom portion of the base 14.

When impact is applied to the top cover 15 under this condition, vibration of the top cover 15 is suppressed in areas near the supporting column portion 32 of the vibration suppression member 16, since the supporting column portion 32 is in contact with the bottom portion of the base 14. Accordingly, the amplitude of vibration at the polygonal portion is made small and the surface deformation of the top cover 15 is suppressed.

Consequently, deviation of the central axis of head assembly 12 secured to the top cover 15 is suppressed and the flying height of the head is stabilized. Effects on read/write operations by the impact on the top cover 15 can also be reduced.

Figure 7:
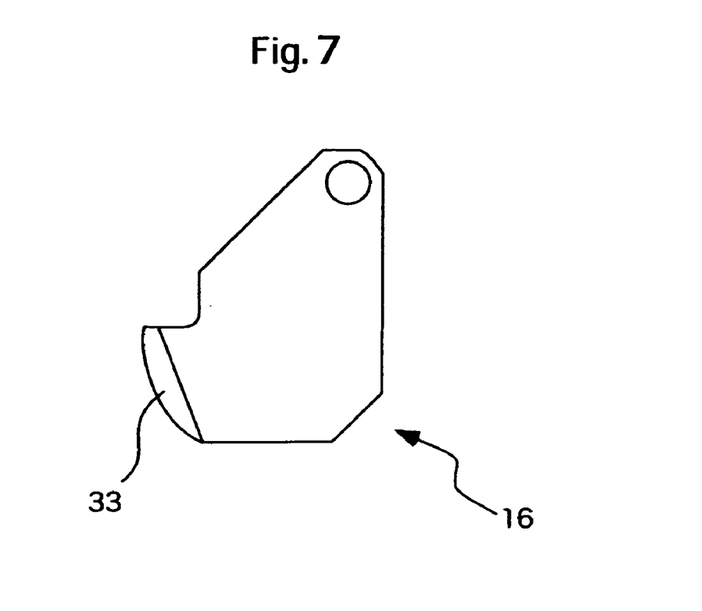
FIG. 7 is a plan view showing an example of the vibration suppression member to be mounted on a circuit unit.
Figure 8:
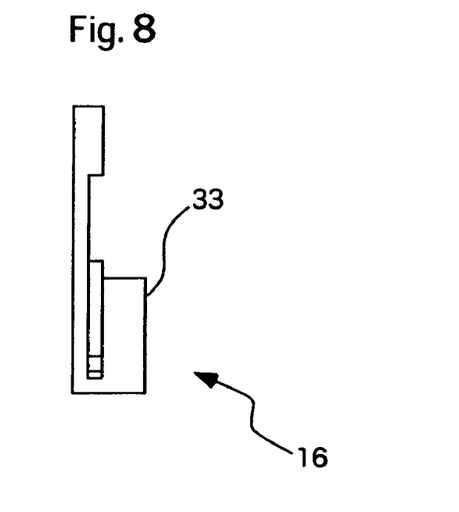
FIG. 8 is a side elevational view showing an example of the vibration suppression member to be mounted on a circuit unit.
Figure 9:
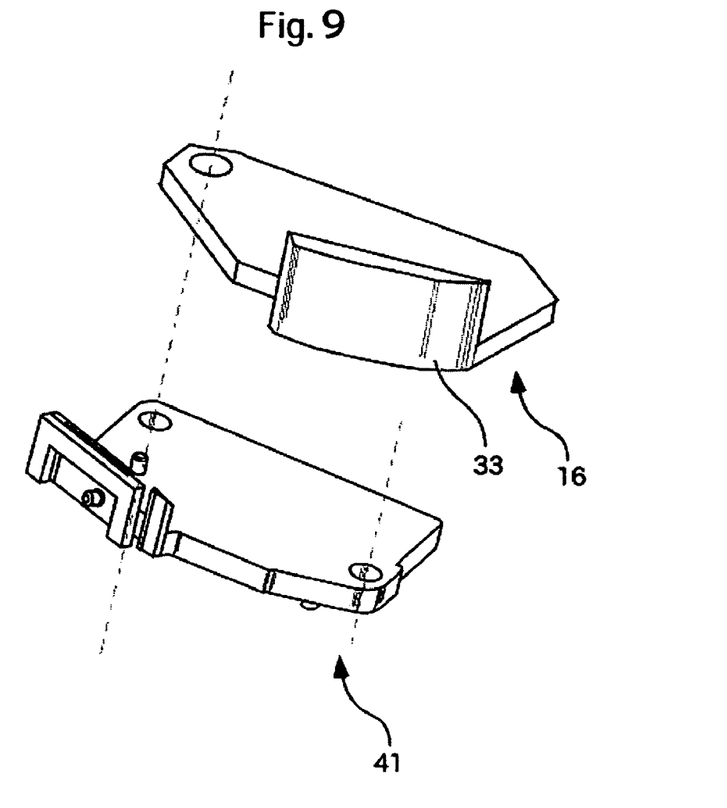
FIG. 9 is a perspective view showing an example of the vibration suppression member to be mounted on a circuit unit.

It is appropriate that the vibration suppression member 16 be disposed at the position of the circuit unit 13. FIG. 7 is a plan view showing an example of the vibration suppression member 16 to be mounted on the circuit unit 13. FIG. 8 is a side elevational view showing the typical vibration suppression member 16 mounted on the circuit unit 13. FIG. 9 is a perspective view showing the typical vibration suppression member 16 to be mounted on the circuit unit 13.

The circuit unit 13 of the disk drive is formed on a flexible circuit board and secured on a circuit base 41 as shown in FIG. 9. The circuit base 41 may, for example, be a sheet body made of resin as shown in FIG. 9. Screw holes are formed in the circuit base 41 for securing the flexible circuit board thereto. The flexible circuit board is omitted from FIG. 9 for ease of understanding of the figure.

This exemplary vibration suppression member 16 to be mounted to the circuit unit 13 is also secured to the circuit base 41. A supporting column portion 33 is formed on the exemplary vibration suppression member 16. The supporting column portion 33 is formed so as to be brought into contact with the top cover 15 when the top cover 15 is attached to the base 14. That is, the top cover 15 is supported by the circuit base 41 and the base 14 through the supporting column portion 33 of the vibration suppression member 16. When impact is applied to the top cover 15 under this condition, vibration of the top cover 15 is suppressed in areas near the supporting column portion 33. Accordingly, the amplitude of vibration at the polygonal portion is made small and the surface deformation of the top cover 15 is suppressed.

The description given heretofore is concerned with an exemplary case, in which the vibration suppression member 16 part is provided in addition to the parts making up the conventional disk drive. Examples of the vibration suppression member 16 according to the embodiment of the present invention are not limited to the aforementioned one.

Figure 10:
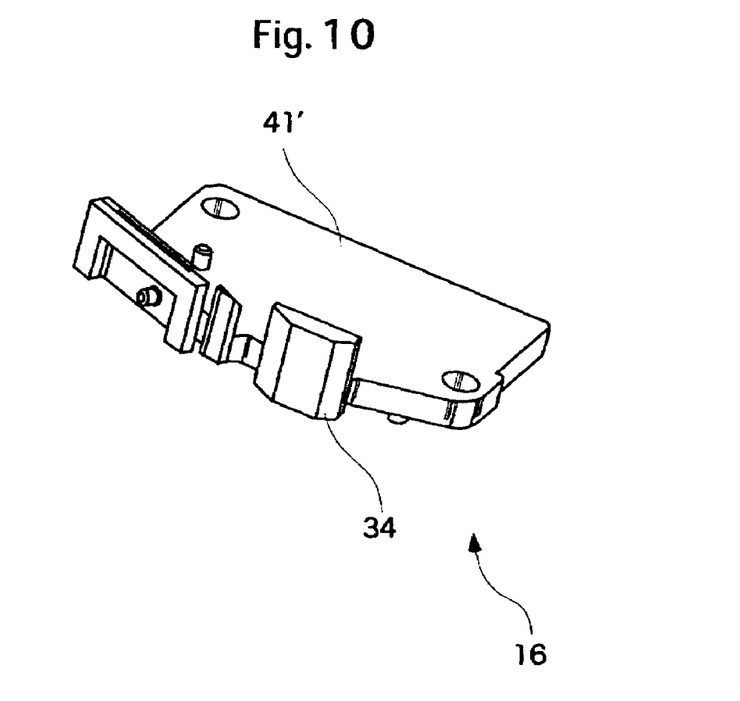
FIG. 10 is a perspective view showing an example of the vibration suppression member formed by deforming part of a circuit unit structure.

It is appropriate, for example, that a supporting body is formed at a part of the structure of the circuit unit 13. As an example of such an arrangement, a case, in which a supporting body is provided by deforming part of the circuit base 41 shown in FIG. 9, will be described. FIG. 10 is a perspective view showing a circuit base 41' including a supporting body provided at a part thereof. The circuit base 41' is configured such that a supporting column portion 34 is formed on an outer peripheral portion of the conventional circuit base 41. The supporting column portion 34 is formed such that its surface on the side of the top cover 15 contacts the top cover 15 when the top cover 15 is attached to the base 14.

Specifically, the top cover 15 is supported by the circuit base 41' and the base 14 through the supporting column portion 34 of the circuit base 41' serving as the vibration suppression member 16. If impact is applied to the top cover 15 in this condition, vibration of the top cover 15 is suppressed at an area near the supporting column portion 34. Accordingly, the amplitude of vibration at the polygonal portion is made small and the surface deformation of the top cover 15 is suppressed.

The use of the circuit base 41' as demonstrated in the example cited above can suppress the surface deformation of the top cover 15 without requiring any additional part. This lessens manufacturing load.

Figure 11:
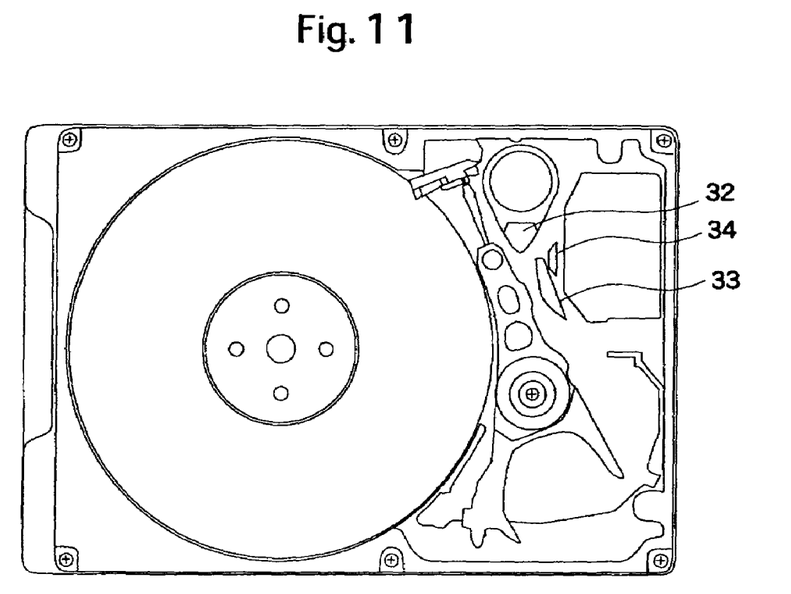
FIG. 11 is an explanatory view showing different supporting positions of the vibration suppression member.

FIG. 11 is a plan view showing different supporting positions of the vibration suppression member 16 as exemplified in different modes cited above. Referring to FIG. 11, in either one of the aforementioned modes of the vibration suppression member 16, the top cover 15 is supported in the polygon (the shaded portion P of FIG. 3) including the head assembly 12 and/or the circuit unit 13 and having the attentive points of support and the inner point of support as vertices. Accordingly, vibration of the top cover 15 is suppressed at the corresponding supporting positions. Consequently, the amplitude of vibration at the polygonal portion is made small and the surface deformation of the top cover 15 is suppressed.

Figure 12:
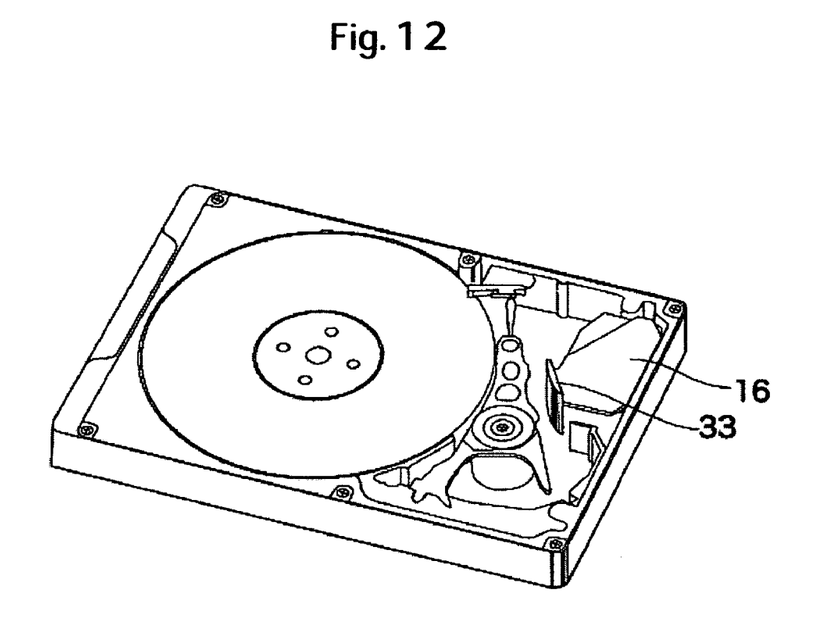
FIG. 12 is a perspective view showing the interior of a disk drive including a vibration suppression member mounted as a separate part on a circuit unit.
Figure 13:
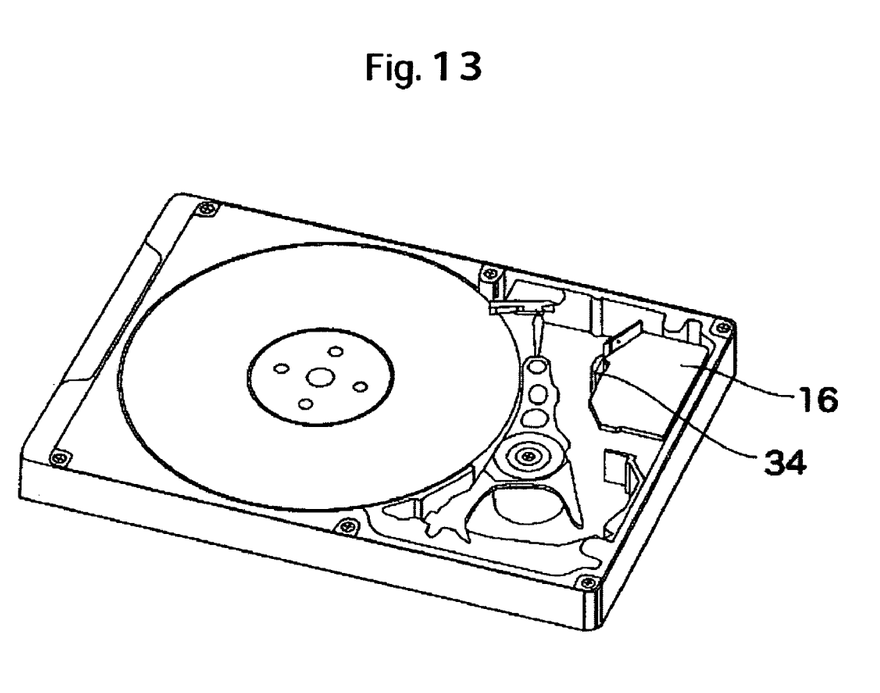
FIG. 13 is a perspective view showing the interior of a disk drive including a vibration suppression member that represents a circuit unit having a supporting body formed as part of a structure thereof.

FIG. 12 is a perspective view showing the interior of a disk drive including a vibration suppression member 16 mounted as a separate part on a circuit unit 13. Further, FIG. 13 is a perspective view showing the interior of a disk drive including a vibration suppression member 16 that represents a circuit unit 13 having a supporting body formed as part of a structure thereof.

The disk drive according to the exemplary embodiment of the present invention includes the structure having the vibration suppression member 16 accommodated in the base 14 which is covered with the top cover 15. A host computer is connected to the disk drive. Receiving a control signal and data from the host computer, the disk drive records data in the recording medium 11. Receiving a read command from the host computer, the disk drive reads data from the recording medium 11 and provides an output to the host computer. Should impact be applied to the top cover 15 during access for read or write operation, the vibration suppression member 16 suppresses vibration of the top cover 15. Deviation of the central axis of the head assembly 12 secured to the top cover 15 is also suppressed. Accordingly, the flying height of the head is stabilized and the effect on read/write operations from the impact on the top cover 15 is reduced.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk drive, comprising:
   a base accommodating a head assembly, a circuit unit, and a recording medium;
   a top cover portion supported by the base at a plurality of inner points of support and peripheral edge points of support on a peripheral edge portion near a portion accommodating the head assembly and the circuit unit, the top cover portion covering the accommodating portion of the base, the head assembly being rotatably supported within the base and a rotational axis of the head assembly being secured to the top cover; and
   a vibration suppression member disposed in a polygon having as vertices a plurality of inner points of support, and of the peripheral edge points of support, the peripheral edge points of support near the portion accommodating the head assembly and the circuit unit, at a corresponding position in the polygonal portion corresponding to an area near a loop of vibration in a surface of the top cover, the vibration suppression member functioning to suppress the vibration of the top cover portion,
   wherein the vibration suppression member includes a supporting body for supporting the top cover at the corresponding position,
   wherein the supporting body is at a part of a structure of the circuit unit and in contact with the top cover portion at the corresponding position.

2. The disk drive according to claim 1,
   wherein the circuit unit includes a flexible circuit board and a circuit base securing the flexible circuit board; and
   wherein the supporting body is disposed on an outer peripheral portion of the circuit base.

3. The disk drive according to claim 2,
   wherein the vibration suppression member is formed integrally with the circuit base as a single body.

4. The disk drive according to claim 1, wherein one inner point of support is disposed at a rotational axis of the head assembly.

5. The disk drive according to claim 1, wherein one peripheral edge point of support is disposed at a corner of the top cover closest to the head assembly.

6. The disk drive according to claim 1, wherein one peripheral edge point of support is disposed at a corner of the top cover closest to the circuit unit.

7. The disk drive according to claim 1, wherein one peripheral edge point of support is disposed at a periphery side of the top cover closer than a corner of the top cover to the head assembly.

8. A disk drive, comprising:
   a base accommodating a head assembly, a circuit unit, and a recording medium;
   a top cover portion supported by the base at a plurality of inner points of support and peripheral edge points of support on a peripheral edge portion near a portion accommodating the head assembly and the circuit unit, the top cover portion covering the accommodating portion of the base, the head assembly being rotatably supported within the base and a rotational axis of the head assembly being secured to the top cover;
   a vibration suppression member disposed in a polygon having as vertices a plurality of inner points of support, and of the peripheral edge points of support, the peripheral edge points of support near the portion accommodating the head assembly and the circuit unit, at a corresponding position in the polygonal portion corresponding to an area near a loop of vibration in a surface of the top cover, the vibration suppression member functioning to suppress the vibration of the top cover portion; and
   a filter disposed on the base,
   wherein the vibration suppression member is mounted on the filter and includes a supporting body for supporting the top cover at the corresponding position.

9. A disk drive, comprising:
   a base accommodating a head assembly, a circuit unit, and a recording medium;
   a top cover portion supported by the base at a plurality of points of support including at least one inner point of support and at least one peripheral edge point of support on a peripheral edge portion near a portion accommodating the head assembly and the circuit unit, the top cover portion covering the accommodating portion of the base, the head assembly being rotatably supported within the base and a rotational axis of the head assembly being secured to the top cover; and a vibration suppression member disposed in a polygon having as vertices a plurality of points of support including the at least one inner point of support and the at least one peripheral edge point of support near the portion accommodating the head assembly and the circuit unit, at a corresponding position in the polygonal portion corresponding to an area near a loop of vibration in a surface of the top cover, the vibration suppression member functioning to suppress the vibration of the top cover portion, wherein the vibration suppression member includes a supporting body for supporting the top cover at the corresponding position, and wherein the supporting body is at a part of a structure of the circuit unit and in contact with the top cover portion at the corresponding position.

10. The disk drive according to claim 9,
wherein the circuit unit includes a flexible circuit board and a circuit base securing the flexible circuit board; and
wherein the supporting body is disposed on an outer peripheral portion of the circuit base.

11. The disk drive according to claim 10,
wherein the vibration suppression member is formed integrally with the circuit base as a single body.

12. The disk drive according to claim 9, wherein one inner point of support is disposed at a rotational axis of the head assembly.

13. The disk drive according to claim 9, wherein one peripheral edge point of support is disposed at a corner of the top cover closest to the head assembly.

14. The disk drive according to claim 9, wherein one peripheral edge point of support is disposed at a corner of the top cover closest to the circuit unit.

15. The disk drive according to claim 9, wherein one peripheral edge point of support is disposed at a periphery side of the top cover closer than a corner of the top cover to the head assembly.

16. A disk drive, comprising:
a base accommodating a head assembly, a circuit unit, and a recording medium;

a top cover portion supported by the base at a plurality of points of support including at least one inner point of support and at least one peripheral edge point of support on a peripheral edge portion near a portion accommodating the head assembly and the circuit unit, the top cover portion covering the accommodating portion of the base, the head assembly being rotatably supported within the base and a rotational axis of the head assembly being secured to the top cover;

a vibration suppression member disposed in a polygon having as vertices a plurality of points of support including the at least one inner point of support and the at least one peripheral edge point of support near the portion accommodating the head assembly and the circuit unit, at a corresponding position in the polygonal portion corresponding to an area near a loop of vibration in a surface of the top cover, the vibration suppression member functioning to suppress the vibration of the top cover portion; and a filter disposed on the base, wherein the vibration suppression member is mounted on the filter and includes a supporting body for supporting the top cover at the corresponding position.

* * * * *

UNITED STATES PATENT AND TRADEMARK OFFICE
CERTIFICATE OF CORRECTION

| | | |
|---|---|---|
| PATENT NO. | : 7,545,599 B2 | Page 1 of 1 |
| APPLICATION NO. | : 11/318261 | |
| DATED | : June 9, 2009 | |
| INVENTOR(S) | : Serizawa et al. | |

It is certified that error appears in the above-identified patent and that said Letters Patent is hereby corrected as shown below:

Claim 1, column 6, line 7, please delete "at"

Claim 9, column 7, line 14, please delete "at"

Signed and Sealed this

Eighteenth Day of August, 2009

David J. Kappos
*Director of the United States Patent and Trademark Office*